(12) United States Patent
Gill

(10) Patent No.: US 10,241,354 B1
(45) Date of Patent: Mar. 26, 2019

(54) ELECTRO-OPTIC MODULATOR WITH A PERIODIC JUNCTION ARRANGEMENT

(71) Applicant: International Business Machines Corporation, Armonk, NY (US)

(72) Inventor: Douglas Max Gill, South Orange, NJ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/920,785

(22) Filed: Mar. 14, 2018

(51) Int. Cl.
| G02F 1/025 | (2006.01) |
|---|---|
| G02F 1/017 | (2006.01) |
| G02F 1/225 | (2006.01) |
| G02F 1/015 | (2006.01) |

(52) U.S. Cl.
CPC .......... *G02F 1/025* (2013.01); *G02F 1/01708* (2013.01); *G02F 1/2255* (2013.01); *G02F 2001/0151* (2013.01); *G02F 2202/10* (2013.01)

(58) Field of Classification Search
CPC ...... G02F 1/025; G02F 1/2255; G02F 1/2257; G02F 1/0356; G02F 2001/0151–2001/0157; G02F 2201/127
USPC ......................................................... 385/1–3
See application file for complete search history.

(56) References Cited

U.S. PATENT DOCUMENTS

| 6,298,177 | B1 | 10/2001 | House | |
|---|---|---|---|---|
| 7,116,853 | B2* | 10/2006 | Gunn, III | G02F 1/025 385/14 |
| 8,149,493 | B2* | 4/2012 | Chen | G02F 1/025 359/250 |
| 8,737,772 | B2* | 5/2014 | Dong | G02F 1/025 385/2 |
| 9,057,832 | B2 | 6/2015 | Green et al. | |
| 9,110,348 | B2 | 8/2015 | Goi et al. | |
| 9,239,506 | B2 | 1/2016 | Manouvrier | |
| 9,841,618 | B1* | 12/2017 | Poulin | G02F 1/025 |
| 2009/0263078 | A1* | 10/2009 | Hosomi | G02B 6/12004 385/14 |
| 2010/0080504 | A1* | 4/2010 | Shetrit | G02B 6/12004 385/14 |

(Continued)

OTHER PUBLICATIONS

"Silicon waveguide modulator based on carrier depletion in periodically interleaved PN junctions," by Li et al, Optics Express, vol. 17, No. 18, pp. 15947-15950, 2009.*

(Continued)

*Primary Examiner* — Robert Tavlykaev
(74) *Attorney, Agent, or Firm* — Amin, Turocy & Watson, LLP

(57) ABSTRACT

Techniques regard electro-optic modulators are provided. For example, one or embodiments described herein can regard an apparatus that can comprise a first lateral region, a second lateral region, and a central region located on a semiconductor substrate. The first lateral region can be adjacent to a first side of the central region and can have a first conductivity type. The second lateral region can be adjacent to a second side of the central region and can have a second conductivity type. Also, the first side can be opposite to the second side. Further, the central region can comprise a diode junction adjacent to an intrinsic region. The intrinsic region can separate the first lateral region and the second lateral region.

20 Claims, 10 Drawing Sheets

(56) References Cited

U.S. PATENT DOCUMENTS

| | | | |
|---|---|---|---|
| 2010/0099242 A1* | 4/2010 | Fedeli | G02B 6/1347 |
| | | | 438/513 |
| 2014/0286647 A1 | 9/2014 | Ayazi et al. | |
| 2015/0212346 A1 | 7/2015 | Zheng et al. | |
| 2015/0316795 A1 | 11/2015 | Hui et al. | |
| 2016/0124251 A1 | 5/2016 | Zhang et al. | |
| 2016/0266416 A1 | 9/2016 | Gill | |
| 2016/0313577 A1* | 10/2016 | Sun | G02F 1/025 |
| 2017/0102564 A1* | 4/2017 | Sakamoto | G02F 1/0123 |
| 2017/0254955 A1* | 9/2017 | Poon | G02B 6/1347 |

OTHER PUBLICATIONS

"25 Gbit/s silicon microring modulator based on misalignment-tolerant interleaved PN junctions," by Xiao et al, Optics Express, vol. 20, No. 3, pp. 2507-2510, 2012.*

Li, et al., Silicon waveguide modulator based on carrier depletion in periodically interleaved PN junctions, Optics Express, Aug. 25, 2009, pp. 15947-15958, vol. 17 No. 18.

Gill, et al., Modulator figure of merit for short reach data links, Optics Express, Sep. 25, 2017, pp. 24326-24339, vol. 25. No. 20.

Watts, et al., Low-Voltage, Compact, Depletion-Mode, Silicon Mach—Zehnder Modulator, IEEE Jornal of Selected Topics in Quantum Electronices, Jan. 2010, pp. 159-164, vol. 16. No. 1.

* cited by examiner

ELECTRO-OPTIC MODULATOR WITH A PERIODIC JUNCTION ARRANGEMENT

BACKGROUND

The subject disclosure relates to an electro-optic modulator, and more specifically to an electro-optic modulator comprising one or more diode junctions positioned separated by one or more intrinsic regions.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, apparatuses, and/or methods that regard an electro-optic modulator with one or more diode junctions adjacent to one or more intrinsic regions are described.

According to an embodiment, an apparatus is provided. The apparatus can comprise a first lateral region, a second lateral region, and a central region located on a semiconductor substrate. The first lateral region can be adjacent to a first side of the central region and can have a first conductivity type. The second lateral region can be adjacent to a second side of the central region and can have a second conductivity type. Also, the first side can be opposite to the second side. Further, the central region can comprise a diode junction adjacent to an intrinsic region. The intrinsic region can separate the first lateral region and the second lateral region.

According to another embodiment, a method is provided. The method can comprise implanting a first dopant of a first conductivity type into a semiconductor substrate to form a first conductivity layer. The method can also comprise implanting a second dopant of a second conductivity type into the semiconductor substrate to form a second conductivity layer. A portion of the second conductivity layer can overlap a portion of the first conductivity layer to form a diode junction. Further, the method can comprise forming an intrinsic region between the first conductivity layer and the second conductivity layer. The intrinsic region can be adjacent to the diode junction.

According to another embodiment, an apparatus is provided. The apparatus can comprise a junction zone. The apparatus can also comprise a first diode junction that can comprise a first layer that can have a first conductive type and a second layer that can have a second conductive type. The first diode junction can be located on a semiconductor substrate and within the junction zone. The apparatus can further comprise a second diode junction that can comprise the first layer and the second layer. The second diode junction can be located on the semiconductor substrate and within the junction zone. Moreover, the apparatus can have an intrinsic region located on the semiconductor substrate and between the first diode junction and the second diode junction.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Plasma-dispersion inter-digitated phase shifters can utilize electro-optic modulators to control operational states of light propagating through a waveguide. Intrinsic to the function of an electro-optic modulator is an optical loss and a limited extinction ratio (e.g., a contrast between operational states). The optical loss directly relates to how far a system can transmit data via the electro-optic modulator (e.g., the lower the optical loss, the further data can be transmitted). Optical loss can be particularly relevant in optical communication links without optical amplification. Conventional waveguides can comprise a high volume of diode junctions sequentially placed adjacent to each other to provide high sensitivity; thereby facilitating control over the speed of light propagating through the wave guide. However, the high volume of diode junctions can contribute a large amount of charge carriers, which can increase the optical loss associated with the electro-optic modulator.

One or more embodiments described herein can regard an electro-optic modulator that can minimize optical loss while maintaining a high-performance extinction ratio. For example, various embodiments described herein can regard an electro-optic modulator comprising periodic vertical diode junctions that can give small critical features and effectively reduce the volume of charge carriers in doped regions. For instance, one or more intrinsic regions can be positioned to lengthen gaps between periodic diode junctions, which does not create relatively large intrinsic regions between doped regions since junction depletion width in a vertical direction can narrow. Therefore, one or more embodiments of the electro-optic modulator described herein can exhibit field drops predominantly in regions with dopants and maintain good sensitivity, while intrinsic regions between diode junctions can reduce characteristic line capacitance.

Figure 1:
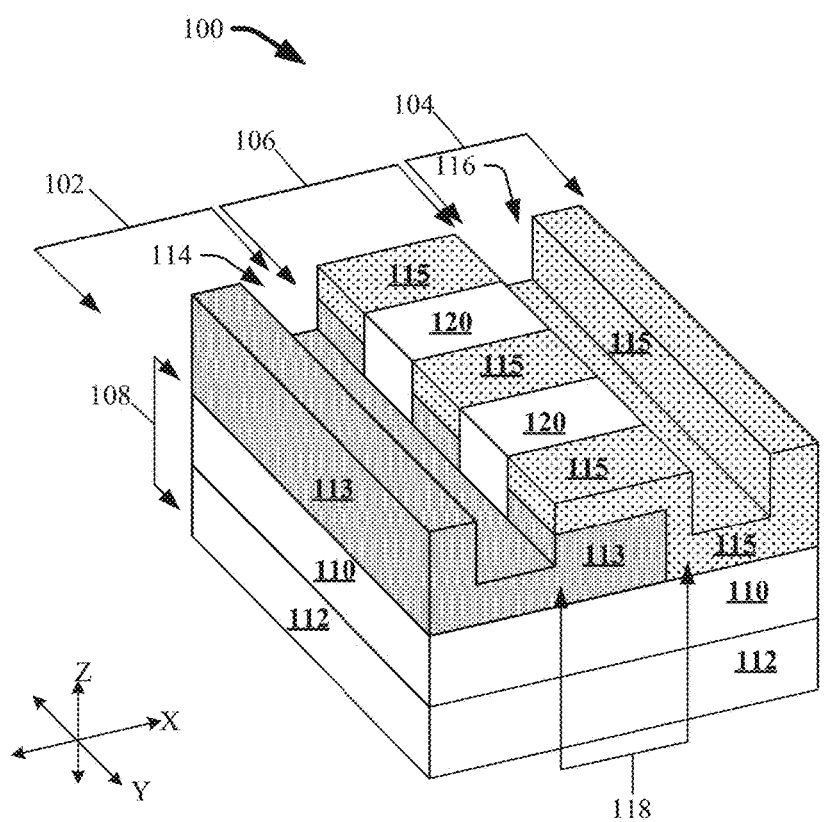
FIG. 1 illustrates a diagram of an example, non-limiting electro-optic modulator comprising periodic vertical diode junctions in accordance with one or more embodiments described herein.

FIG. 1 illustrates a diagram of an example, non-limiting electro-optic modulator 100 that can comprise one or more junctions in accordance with one or more embodiments described herein. The electro-optic modulator 100 can comprise a first lateral region 102 and a second lateral region 104 that can flank a central region 106 along as "X" axis shown in FIG. 1. Also, the electro-optic modulator 100 can be positioned on a semiconductor substrate 108.

In one or more embodiments, the semiconductor substrate 108 can be a silicon-on-insulator ("SOI"). For example, the semiconductor substrate 108 can comprise a buried oxide layer 110 and/or a silicon wafer layer 112 (e.g., a complementary metal-oxide-semiconductor "CMOS" wafer). In one or more embodiments, the electro-optic modulator 100 can be positioned on top of the buried oxide layer 110 along a "Z" axis shown in FIG. 1. Further, the buried oxide layer 110 can be positioned on top of the silicon wafer layer 112 along the "Z" axis.

The first lateral region 102 (e.g., a terminal zone) can comprise one or more first conductivity layers 113, which can comprise a semiconductor material (e.g., silicon) doped with one or more implants of a first conductivity type. For example, the first lateral region 102 can be an N-doped region of the electro-optic modulator 100. In another example, the first lateral region 102 can be a P-doped region of the electro-optic modulator 100. The first lateral region 102 can flank the central region 106 along the "X" axis. For example, the first lateral region 102 can flank a left side of the central region 106 along the "X" axis (e.g., as shown in FIG. 1). For example, the first lateral region 102 can be positioned adjacent to a first side of the central region 106 (e.g., the left side of the central region 106). Further, the first lateral region 102 can extend the length of the central region 106 along a "Y" axis as shown in FIG. 1. Additionally, the first lateral region 102 can comprise a first trench 114 positioned adjacent to the central region 106. The first trench 114 can be formed via, for example, a "shallow" trench etch such that the first trench 114 does not extend entirely to the semiconductor substrate 108 along the "Z" axis. For example, as shown in FIG. 1, a portion of the one or more first conductivity layers 113 can be positioned between the bottom of the first trench 114 and the semiconductor substrate 108. Also, the one or more first conductivity layers 113 can define one or more sides of the first trench 114. For example, the one or more first conductivity layers 113 can define a left side and a bottom of the first trench 114, whereas the central region 106 can define the right side of the first trench 114 (e.g., as shown in FIG. 1).

The second lateral region 104 (e.g., a terminal zone) can comprise one or second conductivity layers 115, which can comprise a semiconductor material (e.g., silicon) doped with one or more implants of a second conductivity type, which can be opposite to the first conductivity type. For example, wherein the first lateral region 102 can be N-doped, the second lateral region 104 can be a P-doped region of the electro-optic modulator 100. In another example, wherein the first lateral region 102 can be P-doped, the second lateral region 104 can be an N-doped region of the electro-optic modulator 100. The second lateral region 104 can flank the central region 106 opposite the first lateral region 102 along the "X" axis. For example, wherein the first lateral region 102 can flank a left side of the central region 106, the second lateral region 104 can flank a right side of the central region 106 along the "X" axis (e.g., as shown in FIG. 1). The second lateral region 104 can be positioned adjacent to a second side of the central region 106 (e.g., the right side of the central region 106), wherein the second side of the central region 106 can be opposite the first side of the central region 106. Further, the second lateral region 104 can extend the length of the central region 106 along the "Y" axis (e.g., as shown in FIG. 1). Additionally, the second lateral region 104 can comprise a second trench 116 positioned adjacent to the central region 106. The second trench 116 can be formed via, for example, a "shallow" trench etch such that the second trench 116 does not extend entirely to the semiconductor substrate 108 along the "Z" axis. For example, as shown in FIG. 1, a portion of the second lateral region 104 can be positioned between the bottom of the second trench 116 and the semiconductor substrate 108. Also, the one or more second conductivity layers 115 can define one or more sides of the second trench 116. For example, the one or more second conductivity layers 115 can define a right side and a bottom of the second trench 116, whereas the central region 106 can define the left side of the second trench 116 (e.g., as shown in FIG. 1).

The central region 106 can be a junction zone that can serve as a waveguide core for the electro-optic modulator 100. The central region 106 can comprise one or more diode junctions 118, for example vertical junctions, arranged periodically throughout the central region 106 along the "Y" axis. Further, the central region 106 can comprise one or more intrinsic regions 120 (e.g., comprising an intrinsic silicon semiconductor region) located between the one or more diode junctions 118 (e.g., vertical junctions). The one or more diode junctions 118 can be a junction between the first lateral region 102, having a first conductivity type (e.g., an N-type), and the second lateral region 104, having a second conductivity type (e.g., P-type). For example, the one or more diode junctions 118 can be P-N junctions. The one or more diode junctions 118 can be vertical junctions that can comprise the first conductivity layer 113 partially surrounded by the second conductivity layer 115. For example, the first conductivity layer 113 can extend from the first lateral region 102 and into a position between the second conductivity layer 115 and the semiconductor substrate 108. Further, a portion of the second conductivity layer 115 can extend from the second lateral region 104 and into a position between an end of the first conductivity layer 113 and the second lateral region 104.

Thus, the first conductivity layer 113 can extend into the central region 106 from the first lateral region 102 to comprise the one or more diode junctions 118, and the second conductivity layer 115 can extend into the central region 106 from the second lateral region 104 to further comprise the one or more diode junctions 118. Therefore, one or more diode junctions 118 can be in direct contact with the first lateral region 102 and/or the second lateral region 104. One of ordinary skill in the art will recognize that the thickness of the first conductivity layer 113 within the diode junction 118 and/or the second conductivity layer 115 within the diode junction 118 can be independent respective each other and/or can vary depend on desired performance characteristics of the electro-optic modulator 100. For example, the first conductivity layer 113 can have a thickness within the one or more diode junctions 118 that is greater than or equal to 20 percent of the semiconductor substrate's 108 thickness along the "Z" axis and less than or equal to 80 percent of the semiconductor substrate's 108 thickness along the "Z" axis. In another example, the second conductivity layer 115 can have a thickness within the one or more diode junctions 118 that is greater than or equal to 20 percent of the semiconductor substrate's 108 thickness along the "Z" axis and less than or equal to 80 percent of the semiconductor substrate's 108 thickness along the "Z" axis.

The one or more intrinsic regions 120 can be formed from a portion of the semiconductor substrate 108 (e.g., intrinsic layer 503) that remains un-doped during manufacturing of the electro-optic modulator 100 or was subject to counter doping during manufacturing of the electro-optic modulator 100. The one or more intrinsic regions 120 can have a number of electrons in a conduction band that is equal to a number of holes in a valence band. The one or more intrinsic regions 120 can be distributed throughout the central region 106 along the "Y" axis. Additionally, the one or more intrinsic regions 120 can be protrusions of the semiconductor substrate 108 extending into the central region 106.

In one or more embodiments, the one or more intrinsic regions 120 can be positioned between sequential diode junctions 118 along the "Y" axis. Thus, the central region 106 can comprise a periodic interval of diode junctions 118 that are separated by intrinsic regions 120. For example, FIG. 1 illustrates a repeating arrangement along the "Y" axis of the central region 106, wherein a diode junction 118 can be followed by an intrinsic region 120 that can be further followed by another diode junction 118. While FIG. 1 depicts an intrinsic region 120 following each diode junction 118, the architecture of the central region 106 is not so limited. For example, intrinsic regions 120 can be positioned between blocks of diode junctions 118, wherein the blocks can comprise two or more diode junctions 118 along the "Y" axis. For instance, the central region 106 can comprise a repeating arrangement along the "Y" axis in which a diode junction 118 can be followed by another diode junction 118 that can be further followed by an intrinsic region 120. In another example, the one or more intrinsic regions 120 can be distributed randomly throughout the central region 106 along the "Y" axis.

One of ordinary skill in the art will recognize that the height (e.g., along the "Z" axis), width (e.g., along the "X" axis), and/or length (e.g., along the "Y" axis) of the one or more intrinsic regions 120 can vary depending on one or more desired performance characteristics of the electro-optic modulator 100. For example, the height (e.g., along the "Z" axis) of the one or more intrinsic regions 120 can be greater than or equal to 50 nanometers (nm) and less than or equal to 1000 nm. In another example, the width (e.g., along the "X" axis) of the one or more intrinsic regions 120 can be greater than or equal to 200 nm and less than or equal to 500 nm. In another example, the length (e.g., along the "Y" axis) of the one or more intrinsic regions 120 can be greater than or equal to 100 nm and less than or equal to 500 nm. For instance, the length (e.g., along the "Y" axis) of the one or more intrinsic regions can directly affect the line capacitance of the electro-optic modulator 100.

Also, while FIG. 1 shows two intrinsic regions 120 and/or three diode junctions 118, one of ordinary skill in the art will recognize that the number of intrinsic regions 120 and/or the number of diode junctions 118 can vary based on: the dimensions of the one or more intrinsic regions 120, the dimensions of the one or more diode junctions 118, the arrangement of intrinsic regions 120 throughout the central region 106, and/or the dimensions of the central region 106.

In one or more embodiments, the one or more intrinsic regions 120 can have the same and/or substantially similar dimensions as the one or more diode junctions 118. In one or more other embodiments, the one or more intrinsic regions 120 can have different dimensions than the one or more diode junctions 118. For example, the one or more intrinsic regions 120 can be characterized by a different height (e.g., along the "Z" axis), width (e.g., along the "X" axis), and/or length (e.g., along the "Y" axis) than one or more of the diode junctions 118. Additionally, the one or more intrinsic regions 120 can extend the entire width (e.g., along the "X" axis) of the central region 106 and/or can extend through only a portion of the width (e.g., along the "X" axis) of the central region 106.

Figure 2A:
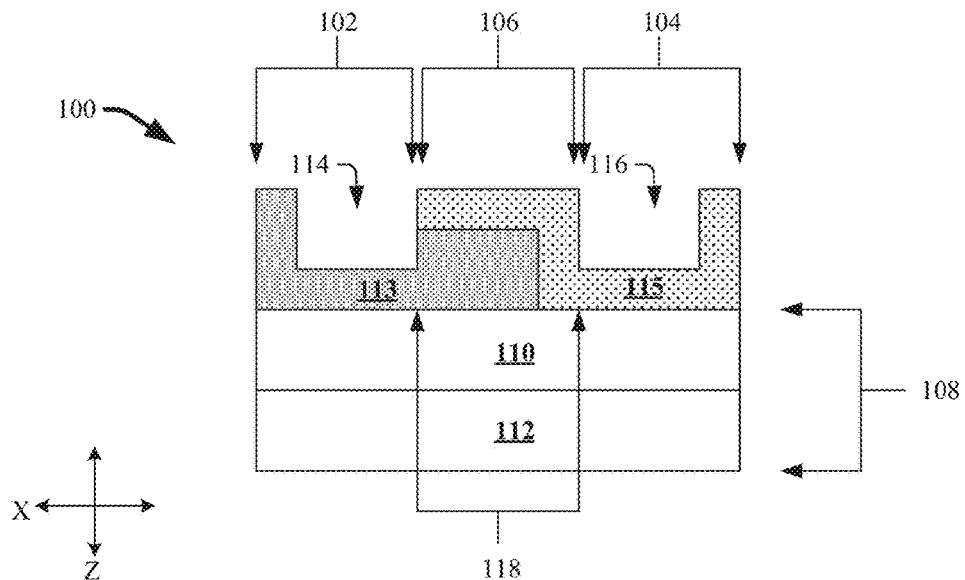
FIG. 2A illustrates a diagram of an example, non-limiting cross-sectional view of an electro-optic modulator comprising periodic vertical diode junctions in accordance with one or more embodiments described herein.

FIG. 2A illustrates a diagram of an example, non-limiting cross-sectional view of the electro-optic modulator 100 in accordance with one or more embodiments described herein. Repetitive description of like elements employed in other embodiments described herein is omitted for sake of brevity. FIG. 2A shows a cross-sectional view of the electro-optic modulator 100 at a position along the "Y" axis where a diode junction 118 is located. As shown in FIG. 2A, the first conductivity layer 113, having a first conductivity type (e.g., N-type), can extend between the first lateral region 102 and/or the central region 106; wherein the first conductivity layer 113 can partially define the first trench 114 (e.g., the left side and the bottom of the first trench 114) and/or comprise a bottom portion of a subject diode junction 118. Also shown in FIG. 2B, the second conductivity layer 115, having a second conductivity type (e.g., P-type), can extend between the second lateral region 104 and/or the central region 106; wherein the second conductivity layer 115 can partially define the second trench 116 (e.g., the right side and the bottom of the second trench 116) and/or comprise a top portion and/or side portion of the subject diode junction 118.

Figure 2B:
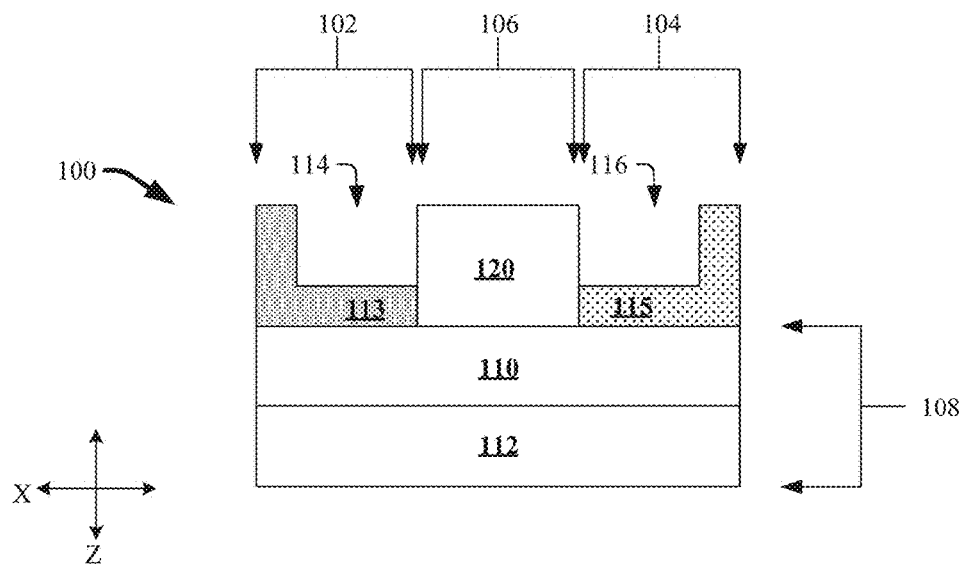
FIG. 2B illustrates a diagram of another example, non-limiting cross-sectional view of an electro-optic modulator comprising periodic vertical diode junctions in accordance with one or more embodiments described herein.

FIG. 2B illustrates a diagram of another example, non-limiting cross-sectional view of the electro-optic modulator 100 in accordance with one or more embodiments described herein. Repetitive description of like elements employed in other embodiments described herein is omitted for sake of brevity. FIG. 2B shows a cross-sectional view of the electro-optic modulator 100 at a position along the "Y" axis where an intrinsic region 120 is located. As shown in FIG. 2B, the subject intrinsic region 120 can separate the first lateral region 102 (e.g., the first conductivity layer 113) from contacting the second lateral region 104 (e.g., the second conductivity layer 115). Also shown in FIG. 2B, the one or more intrinsic regions 120 can be directly adjacent (e.g., directly in contact with) the semiconductor substrate 108. In one or more embodiments, the one or more intrinsic regions 120 can comprise a portion of the semiconductor substrate 108.

Figure 3:
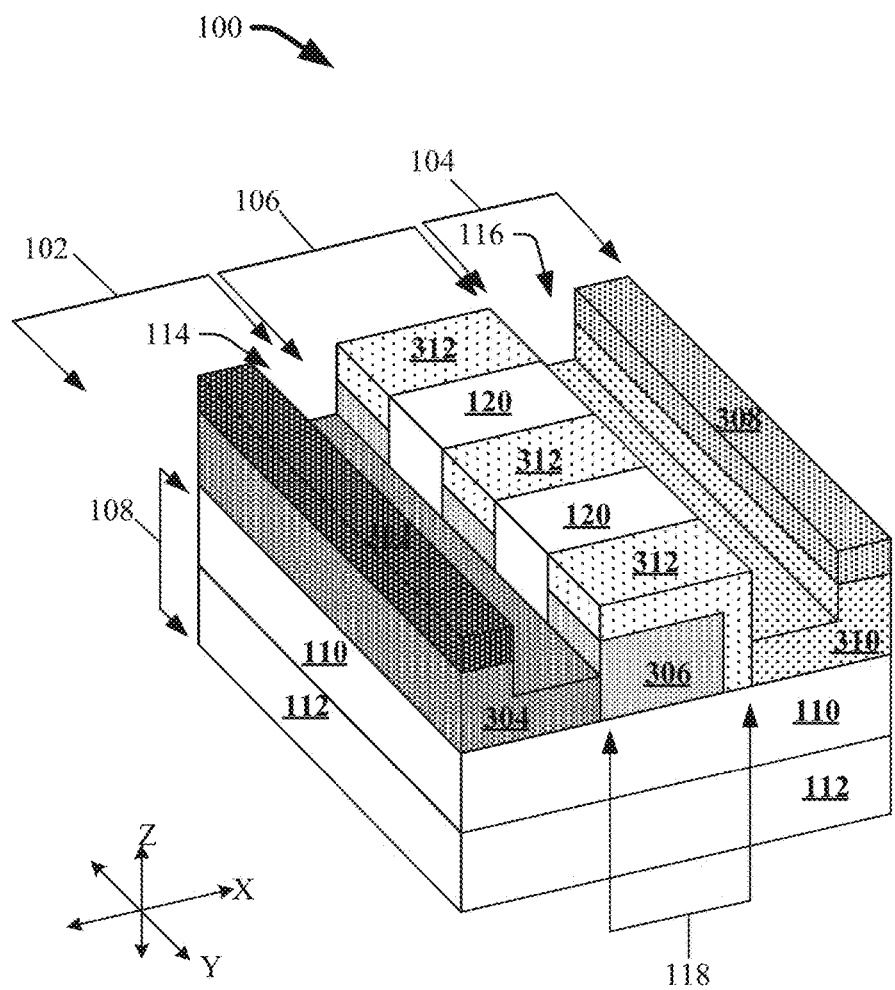
FIG. 3 illustrates a diagram of an example, non-limiting electro-optic modulator comprising periodic vertical diode junctions in accordance with one or more embodiments described herein.

FIG. 3 illustrates a diagram of the example, non-limiting electro-optic modulator 100 comprising multiple doping concentrations in accordance with one or more embodiments described herein. Repetitive description of like elements employed in other embodiments described herein is omitted for sake of brevity. As shown in FIG. 3, the first conductivity layer 113 and/or the second conductivity layer 115 can comprise one or more regions of varying doping concentration.

For example, the first conductivity layer 113 can comprise a plurality of dopant regions, wherein each dopant region can be characterized by a different concentration of a conductive implant. FIG. 3 illustrates a first conductivity layer 113 comprising three dopant regions; however, the architecture of the first conductivity layer 113 is not so limited. For example, the first conductivity layer 113 can comprise fewer dopant regions (e.g., two dopant regions) or additional dopant regions (e.g., greater than or equal to four dopant regions). One of ordinary skill in the art will recognize that the number of dopant regions comprising the first conductivity layer 113 can vary depending on desired performance characteristics of the electro-optic modulator 100.

Wherein the first conductivity layer 113 comprises three dopant regions (e.g., as illustrated in FIG. 3), a first dopant region 302 can be characterized as having the highest concentration of a conductive implant amongst the three dopant regions. For example, wherein the first conductivity layer 113 has an N conductivity type, the first dopant region 302 can be $N^{++}$-doped. In another example, wherein the first conductivity layer 113 has a P conductivity type, the first dopant region 302 can be $P^{++}$-doped. In one or more embodiments, a first contact (not shown) can be positioned adjacent to the first dopant region 302, wherein the first dopant region's 302 high doping level can provide improved contact resistance than would otherwise be exhibited by a lower doping level.

A second dopant region 304 can be characterized as having the next highest concentration of a conductive implant amongst the three dopant regions. For example, wherein the first conductivity layer 113 has an N conductivity type, the second dopant region 304 can be $N^+$-doped. In another example, wherein the first conductivity layer 113 has a P conductivity type, the second dopant region 304 can be $P^+$-doped. In one or more embodiments, the second dopant region 304 can extend from the first dopant region 302 to the central region 106.

A third dopant region 306 can be characterized as having the lowest concentration of a conductive implant amongst the three dopant regions. For example, wherein the first conductivity layer 113 has an N conductivity type, the third dopant region 306 can be N-doped. In another example, wherein the first conductivity layer 113 has a P conductivity type, the third dopant region 306 can be P-doped. In one or more embodiments, the third dopant region 306 can be located a portion of the first conductivity layer 113 that extends into the central region 106. Thus, a doping concentration of the first dopant region 302 can be higher than a doping concentration of the second dopant region 304, which can be higher than a doping concentration of the third dopant region 306.

For example, the second conductivity layer 115 can also comprise a plurality of dopant regions, wherein each dopant region can be characterized by a different concentration of a conductive implant. FIG. 3 illustrates a second conductivity layer 115 comprising three dopant regions; however, the architecture of the second conductivity layer 115 is not so limited. For example, the second conductivity layer 115 can comprise fewer dopant regions (e.g., two dopant regions) or additional dopant regions (e.g., greater than or equal to four dopant regions). One of ordinary skill in the art will recognize that the number of dopant regions comprising the second conductivity layer 115 can vary depending on desired performance characteristics of the electro-optic modulator 100.

Wherein the second conductivity layer 115 comprises three dopant regions (e.g., as illustrated in FIG. 3), a fourth dopant region 308 can be characterized as having the highest concentration of a conductive implant amongst the three dopant regions. For example, wherein the second conductivity layer 115 has an N conductivity type, the fourth dopant region 308 can be $N^{++}$-doped. In another example, wherein the second conductivity layer 115 has a P conductivity type, the fourth dopant region 308 can be $P^{++}$-doped. In one or more embodiments, a second contact (not shown) can be positioned adjacent to the fourth dopant region 308, wherein the fourth dopant region's 308 high doping level can provide improved contact resistance than would otherwise be exhibited by a lower doping level.

A fifth dopant region 310 can be characterized as having the next highest concentration of a conductive implant amongst the three dopant regions. For example, wherein the second conductivity layer 115 has an N conductivity type, the fifth dopant region 310 can be $N^+$-doped. In another example, wherein the second conductivity layer 115 has a P conductivity type, the fifth dopant region 310 can be $P^+$-doped. In one or more embodiments, the fifth dopant region 310 can extend from the fourth dopant region 308 to the central region 106.

A sixth dopant region 312 can be characterized as having the lowest concentration of a conductive implant amongst the three dopant regions. For example, wherein the second conductivity layer 115 has an N conductivity type, the sixth dopant region 312 can be N-doped. In another example, wherein the second conductivity layer 115 has a P conductivity type, the sixth dopant region 312 can be P-doped. In one or more embodiments, the sixth dopant region 312 can be located a portion of the second conductivity layer 115 that extends into the central region 106. Thus, a doping concentration of the fourth dopant region 308 can be higher than a doping concentration of the fifth dopant region 310, which can be higher than a doping concentration of the sixth dopant region 312.

Figure 4A:
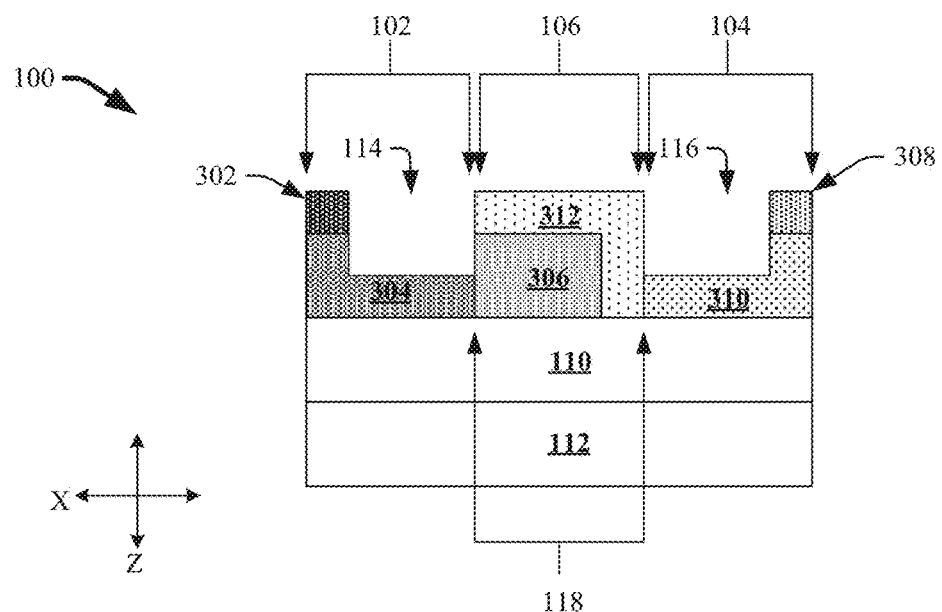
FIG. 4A illustrates a diagram of an example, non-limiting cross-sectional view of an electro-optic modulator comprising periodic vertical diode junctions in accordance with one or more embodiments described herein.

FIG. 4A illustrates a diagram of an example, non-limiting cross-sectional view of the electro-optic modulator 100 with various dopant regions in accordance with one or more embodiments described herein. Repetitive description of like elements employed in other embodiments described herein is omitted for sake of brevity. FIG. 4A shows a cross-sectional view of the electro-optic modulator 100 at a position along the "Y" axis where a subject diode junction 118 is located. As shown in FIG. 4A, three or more dopant regions (e.g., first dopant region 302, second dopant region 304, and/or third dopant region 306) can comprise the first conductivity layer 113, which can extend from the first lateral region 102 into the central region 106 and form a portion of the subject diode junction 118. The first dopant region 302, second dopant region 304, and/or third dopant region 306 can each exhibit different concentrations of a first type of conductive implant (e.g., N-type). Also shown in FIG. 4A, three or more dopant regions (e.g., fourth dopant region 308, fifth dopant region 310, and/or sixth dopant region 312) can comprise the second conductivity layer 115, which can extend from the second lateral region 104 into the central region 106 and form a portion of the subject diode junction 118. The fourth dopant region 308, fifth dopant region 310, and/or sixth dopant region 312 can each exhibit different concentrations of a second type of conductive implant (e.g., P-type).

Figure 4B:
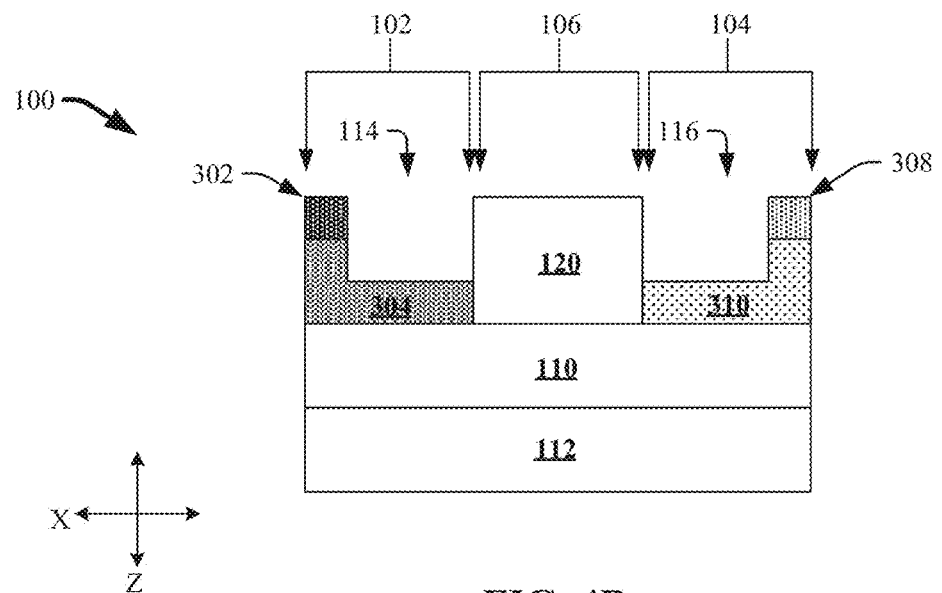
FIG. 4B illustrates a diagram of another example, non-limiting cross-sectional view of an electro-optic modulator comprising periodic vertical diode junctions in accordance with one or more embodiments described herein.

FIG. 4B illustrates a diagram of another example, non-limiting cross-sectional view of the electro-optic modulator 100 in accordance with one or more embodiments described herein. Repetitive description of like elements employed in other embodiments described herein is omitted for sake of brevity. FIG. 4B shows a cross-sectional view of the electro-optic modulator 100 at a position along the "Y" axis where a subject intrinsic region 120 is located. As shown in FIG. 4B, the subject intrinsic region 120 can separate a dopant region of the first conductivity layer 113 (e.g., second dopant region 304) from a dopant region of the second conductivity layer 115 (e.g., fifth dopant region 310).

Figure 5A:
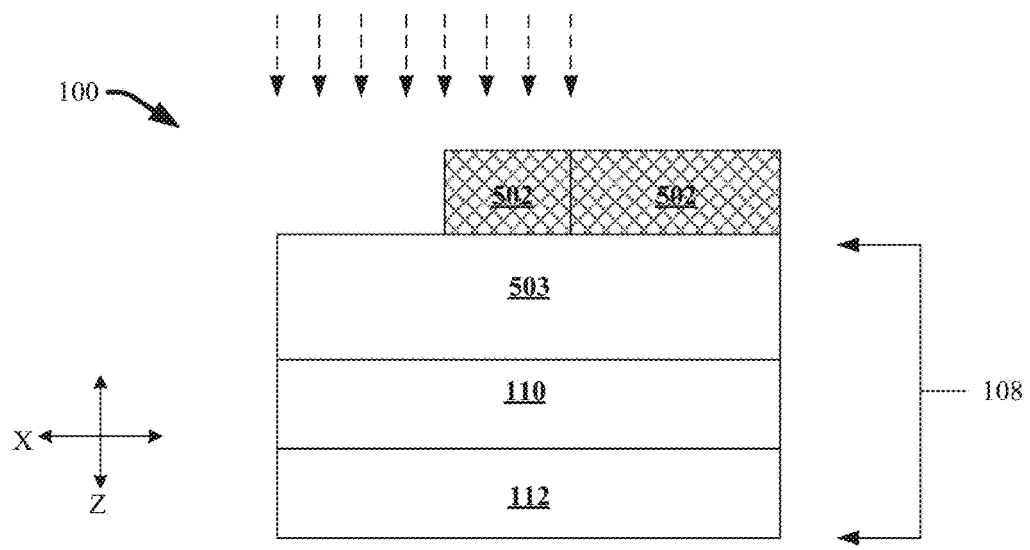
FIG. 5A illustrates a diagram of an example, non-limiting cross-sectional view of an electro-optic modulator comprising periodic vertical diode junctions during a first stage of manufacturing in accordance with one or more embodiments described herein.

FIG. 5A illustrates a diagram of an example, non-limiting cross-sectional view of the electro-optic modulator 100 during a first stage of manufacturing in accordance with one or more embodiments described herein. Repetitive description of like elements employed in other embodiments described herein is omitted for sake of brevity. The first stage of manufacturing can comprise forming the first conductivity layer 113; and thereby, at least a portion of the first lateral region 102.

In FIG. 5A, a first masking layer 502 (e.g., a photolithographic masking layer) can be patterned on an intrinsic layer 503 of a semiconductor substrate 108 (e.g., further comprising the buried oxide layer 110 and/or the silicon wafer layer 112). For example, the intrinsic layer 503 can be an intrinsic silicon layer. The first conductivity layer 113 can be formed by implanting (e.g., as indicated by the dashed arrows in FIG. 5A) one or more dopants of the first conductivity type (e.g., N-type dopants or P-type dopants), for example with differing implant energies and/or doses, into the exposed portions of the intrinsic layer 503. For example, the one or more dopants of the first conductivity can be implanted into the exposed intrinsic layer 503 in a uniform concentration throughout the exposed intrinsic layer 503. In another example, multiple photolithographic processes can be used with different patterning to create a plurality of doping concentrations in different volumes of the device geometry in accordance with the structures discussed above. In a further example, the one or more dopants of the first conductivity can be implanted in varying concentrations and/or energies throughout the exposed intrinsic layer 503 to form a plurality of dopant regions (e.g., first dopant region 302, second dopant region 304, and/or third dopant region 306) using, for example, well-known techniques. For instance, the first conductivity layer 113 can be formed via a plurality of implant processes. A first implant process can implant the first conductivity dopant throughout the entirety of the exposed intrinsic layer 503; whereas one or more subsequent implant processes can implant additional first conductivity dopants into select regions of the exposed intrinsic layer 503.

Figure 5B:
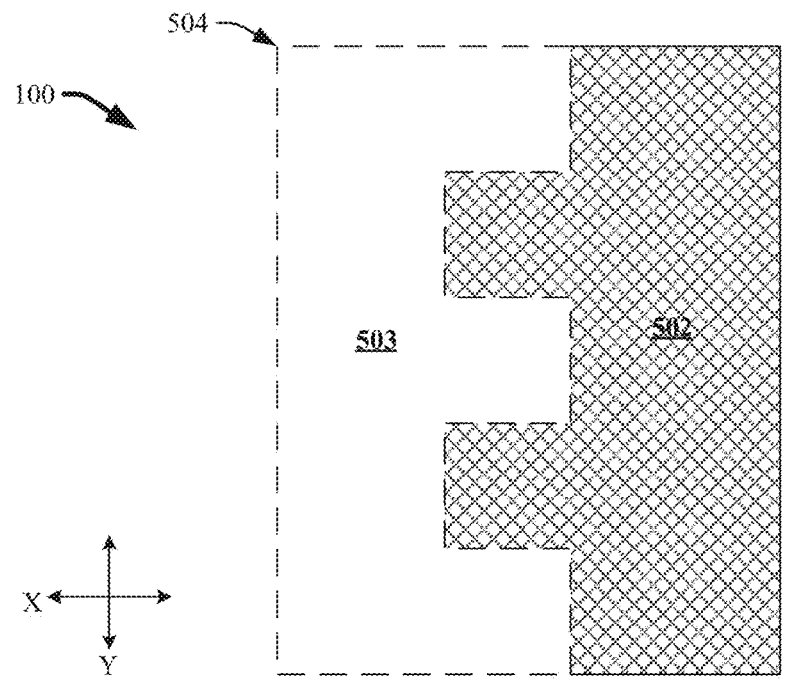
FIG. 5B illustrates a diagram of an example, non-limiting top view of an electro-optic modulator comprising periodic vertical diode junctions during a first stage of manufacturing in accordance with one or more embodiments described herein.

FIG. 5B illustrates a diagram of an example, non-limiting top view of the electro-optic modulator 100 during the first stage of manufacturing in accordance with one or more embodiments described herein. Repetitive description of like elements employed in other embodiments described herein is omitted for sake of brevity. FIG. 5B depicts a first doping area 504 (e.g., shown with dashed lines in FIG. 5B) that can define the exposed intrinsic layer 503 that can be subject to implementation of one or more dopants of the first conductivity type to form the first conductivity layer 113.

The first doping area 504 can define where one or more dopants of the first conductivity type can be implanted into the exposed intrinsic layer 503 to form the first conductivity layer 113. For example, one or more implant processes can implant the one or more dopants of the first conductivity type into the first doping area 504. As shown in FIG. 5B, the first doping area 504 can comprise one or more protrusions into the central region 106 of the electro-optic modulator 100, wherein the one or more diode junctions 118 can be formed at the location of said protrusions during manufacturing of the electro-optic modulator 100. Similarly, FIG. 5B shows that the first masking layer 502 can also comprise one or more protrusions into the central region 106, wherein the one or more intrinsic regions 120 can result from protecting the location of said protrusions from doping during the manufacturing of the electro-optic modulator 100. Subsequent to implanting the one or more dopants of the first conductivity type into the first doping area 504 to form the first conductivity layer 113, the first masking layer 502 can be removed.

Figure 6A:
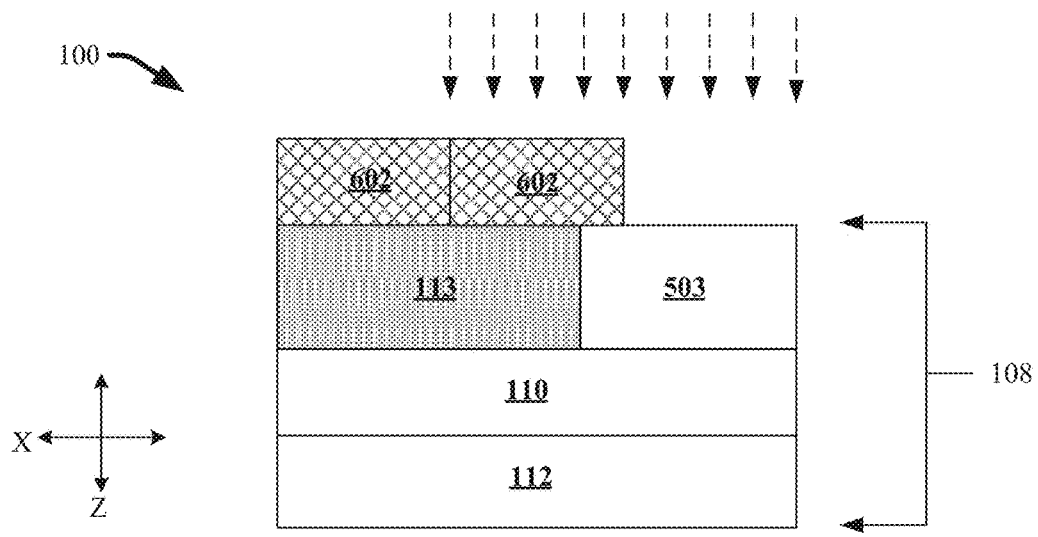
FIG. 6A illustrates a diagram of an example, non-limiting cross-sectional view of an electro-optic modulator comprising periodic vertical diode junctions during a second stage of manufacturing in accordance with one or more embodiments described herein.

FIG. 6A illustrates a diagram of an example, non-limiting cross-sectional view of the electro-optic modulator 100 during a second stage of manufacturing in accordance with one or more embodiments described herein. Repetitive description of like elements employed in other embodiments described herein is omitted for sake of brevity. The second stage of manufacturing can comprise forming the second conductivity layer 115; and thereby, at least a portion of the second lateral region 104 and/or the one or more diode junctions 118.

In FIG. 6A, a second masking layer 602 (e.g., a photolithographic masking layer) can be patterned on the first conductivity layer 113 and a portion of the intrinsic layer 503. The second conductivity layer 115 can be formed by implanting (e.g., as indicated by the dashed arrows in FIG. 6A) one or more dopants of the second conductivity type (e.g., N-type dopants or P-type dopants) in the exposed portions of the intrinsic layer 503. The exposed region can comprise one or more portions of the first conductivity layer 113 formed in the first stage of manufacturing (e.g., as shown in FIGS. 5A and 5B) and/or one or more portions of the intrinsic layer 503.

For example, the one or more dopants of the second conductivity type can be implanted throughout the exposed region in a uniform concentration. In another example, the one or more dopants of the second conductivity can be implanted in varying concentrations and/or energies throughout the exposed region to form a plurality of dopant regions (e.g., fourth dopant region 308, fifth dopant region 310, and/or sixth dopant region 312) using, for example, well-known techniques. For instance, the second conductivity layer 115 can be formed via a plurality of implant processes. A first implant process can implant the second conductivity type dopant throughout the entirety of the exposed region; whereas one or more subsequent implant processes can implant additional second conductivity type dopants (e.g., characterized by different energies) into select locations of the exposed region.

Figure 6B:
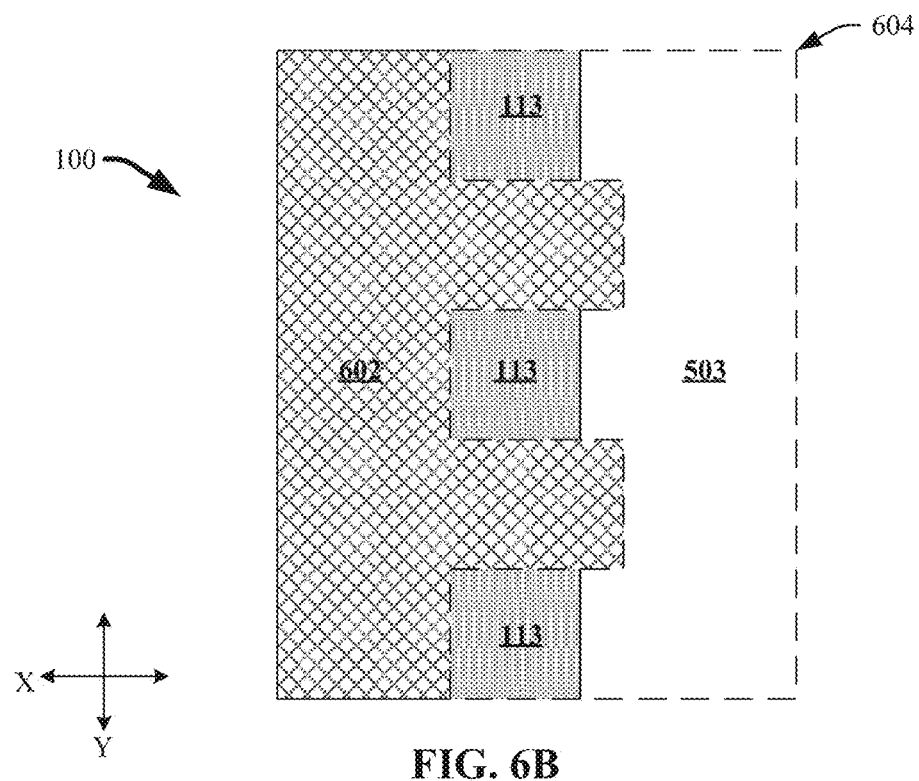
FIG. 6B illustrates a diagram of an example, non-limiting top view of an electro-optic modulator comprising periodic vertical diode junctions during a second stage of manufacturing in accordance with one or more embodiments described herein

FIG. 6B illustrates a diagram of an example, non-limiting top view of the electro-optic modulator 100 during the second stage of manufacturing in accordance with one or more embodiments described herein. Repetitive description of like elements employed in other embodiments described herein is omitted for sake of brevity. FIG. 6B depicts a second doping area 604 (e.g., shown with dashed lines in FIG. 6B) that can define the exposed region that can be subject to implementation of one or more dopants of the second conductivity type to form the second conductivity layer 115.

The second doping area 604 can define wherein one or more dopants of the second conductivity type can be implanted into the exposed region to form the second conductivity layer 115 and/or the one or more diode junctions 118. For example, one or more implant processes can implant the one or more dopants of the second conductivity type into the second doping area 604. As shown in FIG. 6B, the second doping area 604 can comprise one or more protrusions into the central region 106 of the electro-optic modulator 100, wherein the one or more diode junctions 118 can be formed at the location of said protrusions during manufacturing of the electro-optic modulator 100. For example, within the one or more protrusions of the second doping area 604, second conductivity type dopants can be implanted on top of existing first conductivity type dopants to form the structure (e.g., vertical diode junction) of the one or more diode junctions 118. Similarly, FIG. 6B shows that the second masking layer 602 can also comprise one or more protrusions into the central region 106, wherein the one or more intrinsic regions 120 can be result from protecting the location of said protrusions from doping during the manufacturing of the electro-optic modulator 100. Subsequent to implanting the one or more dopants of the second conductivity type into the second doping area 604 to form the second conductivity layer 115 and/or the one or more diode junctions 118, the second masking layer 602 can be removed.

While FIGS. 5A-6B depict forming the one or more intrinsic regions 120 via masking layers (e.g., first masking layer 502 and/or second masking layer 602) that protect a region of the intrinsic layer 503 from doping; the one or more intrinsic regions 120 can alternatively be formed by equally doping regions of the intrinsic layer 503 with the dopants of the first conductivity type and the second conductivity type. For example, the intrinsic regions 120 can result from a counter-doping process. For instance, the masking layers (e.g., first masking layer 502 and/or second masking layer 602) would not extend to locations that would become the one or more intrinsic regions 120, rather said locations would be subject to equal doping of the first conductivity type and the second conductivity type.

Figure 7A:
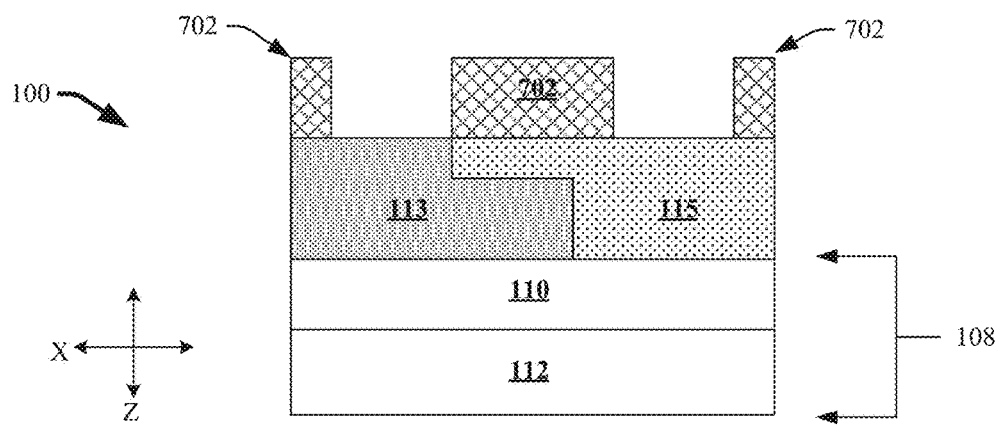
FIG. 7A illustrates a diagram of an example, non-limiting cross-sectional view of an electro-optic modulator comprising periodic vertical diode junctions during a third stage of manufacturing in accordance with one or more embodiments described herein.

FIG. 7A illustrates a diagram of an example, non-limiting cross-sectional view of the electro-optic modulator 100 during a third stage of manufacturing in accordance with one or more embodiments described herein. Repetitive description of like elements employed in other embodiments described herein is omitted for sake of brevity. The third stage of manufacturing can comprise forming the first trench 114 and/or the second trench 116.

In FIG. 7A, a third masking layer 702 (e.g., a photolithographic masking layer) can be patterned onto the first conductivity layer 113, the central region 106, and/or the second conductivity layer 115. An etching process such as, for example, reactive ion etching ("RIE") can be performed to remove exposed portions of the first conductivity layer 113 and/or the second conductivity layer 115 to form the first trench 114 and/or the second trench 116. The etching process can comprise shallow etching such that only a portion of the exposed first conductivity layer 113 and/or second conductivity layer 115 is removed as opposed to all of the exposed regions down to the semiconductor substrate 108 (e.g., the buried oxide layer 110).

Figure 7B:
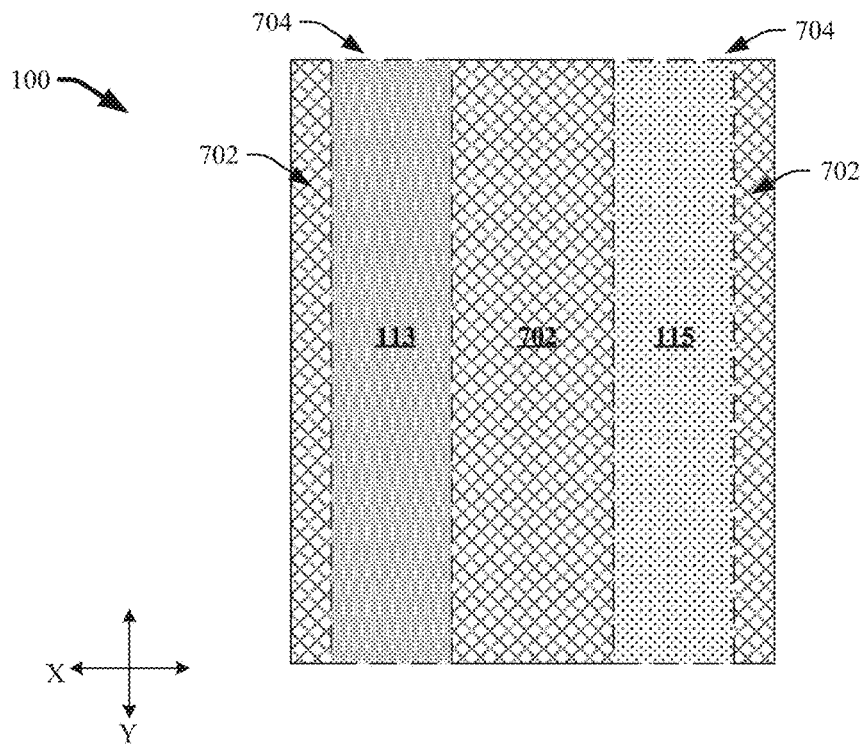
FIG. 7B illustrates a diagram of an example, non-limiting top view of an electro-optic modulator comprising periodic vertical diode junctions during a third stage of manufacturing in accordance with one or more embodiments described herein

FIG. 7B illustrates a diagram of an example, non-limiting top view of the electro-optic modulator 100 during the third stage of manufacturing in accordance with one or more embodiments described herein. Repetitive description of like elements employed in other embodiments described herein is omitted for sake of brevity. FIG. 7B depicts one or more etching areas 704 (e.g., shown with dashed lines in FIG. 7B) that can define the exposed regions of the first conductivity layer 113 and/or the second conductivity layer 115 that can be subject to an etching process to form the first trench 114 and/or the second trench 116. The one or more etching areas 704 can define wherein portions of the first conductivity layer 113 and/or portions of the second conductivity layer 115 can be removed via an etching process.

Figure 8A:
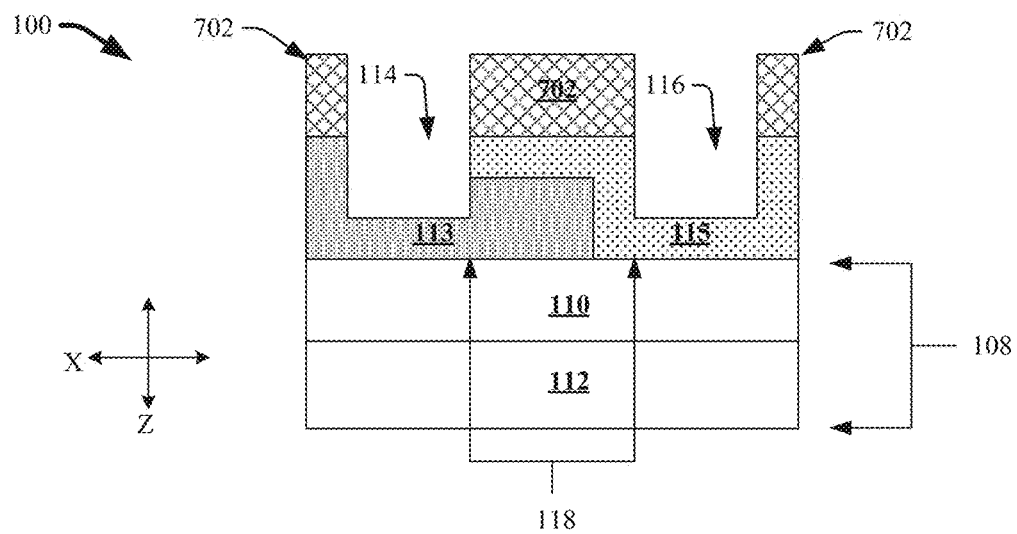
FIG. 8A illustrates a diagram of an example, non-limiting cross-sectional view of an electro-optic modulator comprising periodic vertical diode junctions during a fourth stage of manufacturing in accordance with one or more embodiments described herein.

FIG. 8A illustrates a diagram of an example, non-limiting cross-sectional view of the electro-optic modulator 100 after an etching process performed in the third stage of manufacturing in accordance with one or more embodiments described herein. Repetitive description of like elements employed in other embodiments described herein is omitted for sake of brevity. FIG. 8A shows a cross-sectional view of the electro-optic modulator 100 at a position along the "Y" axis where a diode junction 118 is located. As shown in FIG. 8A, subjecting the one or more etching areas 704 to one or more etching processes can form the first trench 114 and/or the second trench 116 and thereby define the one or more diode junctions 118.

Figure 8B:
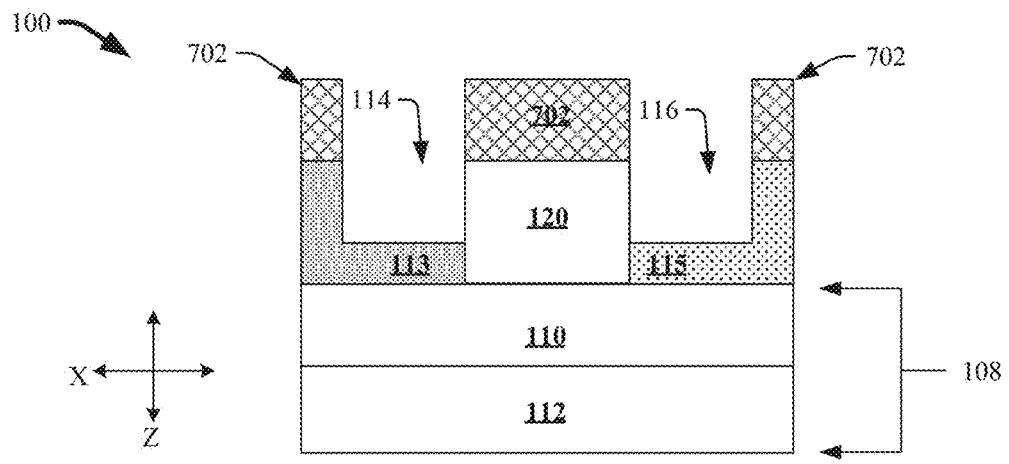
FIG. 8B illustrates a diagram of another example, non-limiting cross-sectional view of an electro-optic modulator comprising periodic vertical diode junctions during a fourth stage of manufacturing in accordance with one or more embodiments described herein.

FIG. 8B illustrates a diagram of an example, non-limiting cross-sectional view of the electro-optic modulator 100 after an etching process performed in the third stage of manufacturing in accordance with one or more embodiments described herein. Repetitive description of like elements employed in other embodiments described herein is omitted for sake of brevity. FIG. 8B shows a cross-sectional view of the electro-optic modulator 100 at a position along the "Y" axis where an intrinsic region 120 is located. As shown in FIG. 8B, subjecting the one or more etching areas 704 to one or more etching processes can form the first trench 114 and/or the second trench 116 and thereby define the one or more intrinsic regions 120. Subsequent to the one or more etching processes, the third masking layer 702 can be removed.

In various embodiments, the masking layers described herein (e.g., the first masking layer 502, the second masking layer 602, and/or the third masking layer 702) can comprise suitable masking material, which can include, but is not limited to: an oxide hardmask material, an organic masking material, a polymer, a combination thereof, and/or the like. Also, the masking layers described herein (e.g., the first masking layer 502, the second masking layer 602, and/or the third masking layer 702) can be formed using, for example, photolithographic patterning techniques. Additionally, one of ordinary skill in the art will recognize that the stages of manufacturing described herein can further be facilitate by one or more known fabrication processes (e.g., activation anneals for the implanted dopants to activate one or more dopant species) to achieve desired operations.

Figure 9:
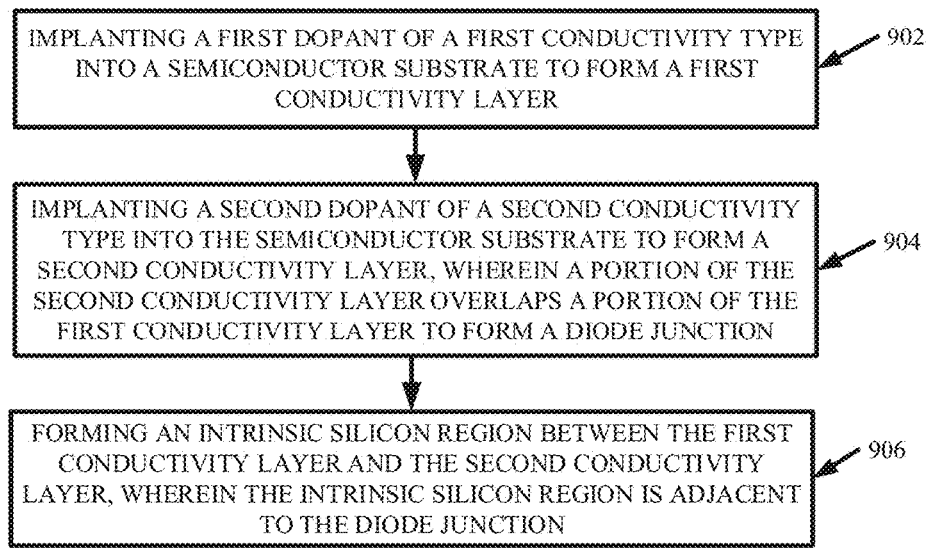
FIG. 9 illustrates a flow diagram of an example, non-limiting method that can facilitate manufacturing an electro-optic modulator comprising periodic vertical diode junctions in accordance with one or more embodiments described herein.

FIG. 9 illustrates a flow diagram of an example, non-limiting method 900 that can facilitate manufacturing the electro-optic modulator 100 in accordance with one or more embodiments described herein. Repetitive description of like elements employed in other embodiments described herein is omitted for sake of brevity.

At 902, the method 900 can comprise implanting a first dopant of a first conductivity type (e.g., N-type or P-type) into a semiconductor substrate 108 (e.g., an intrinsic layer 503) to form a first conductivity layer 113. The implanting at 902 can comprise patterning a first masking layer 502 to define a first doping area 504 as illustrated and/or described herein with regard to FIGS. 5A and/or 5B. The first conductivity layer 113 can comprise a uniform concentration of the first dopant throughout the first doping area 504. Alternatively, the first conductivity layer 113 can comprise varying concentrations of the first dopant in specific locations of the first doping area 504 to form dopant regions (e.g., first dopant region 302, second dopant region 304, and/or third dopant region 306).

At 904, the method 900 can comprise implanting a second dopant of a second conductivity type (e.g., N-type or P-type) into the semiconductor substrate 108 (e.g., an intrinsic layer 503) to form a second conductivity layer 115. The second conductivity type can be different than the first conductivity type. For example, wherein an N-type dopant is implanted at 902, a P-type dopant can be implanted at 904. The implanting at 904 can comprise patterning a second masking layer 602 to define a second doping area 604 as illustrated and/or described herein with regard to FIGS. 6A and/or 6B. The second conductivity layer 115 can comprise a uniform concentration of the second dopant throughout the second doping area 604. Alternatively, the second conductivity layer 115 can comprise varying concentrations of the second dopant in specific locations of the second doping area 604 to form dopant regions (e.g., fourth dopant region 308, fifth dopant region 310, and/or sixth dopant region 312).

As a result of the implanting at 904, a portion of the second conductivity layer 115 can overlap a portion of the first conductivity layer 113 to form one or more diode junctions 118. The one or more diode junctions 118 formed at 904 can be distributed through a central region 106 of the electro-optic modulator 100 along the "Y" axis (e.g., shown in FIG. 1). The one or more diode junctions 118 can be vertical diode junctions (e.g., vertical P-N junctions).

At 906, the method 900 can comprise forming one or more intrinsic regions 120 (e.g., intrinsic silicon regions) between the first conductivity layer 113 and the second conductivity layer 115, wherein the intrinsic region 120 can be adjacent to the diode junction 118. In one or more embodiments, the one or more intrinsic regions 120 can be formed by protecting a portion of the semiconductor substrate 108 (e.g., an intrinsic layer 503) from being doped during the implanting at 902 and/or 904. For example, the semiconductor substrate 108 (e.g., an intrinsic layer 503) can be protected via the first masking layer 502 and/or the second masking layer 602 (e.g., as illustrated in FIGS. 5A-6B). In one or more other embodiments, the one or more intrinsic regions 120 can be formed by counter doping one or more regions of the semiconductor substrate 108 (e.g., the intrinsic layer 503). The one or more intrinsic regions 120 formed at 906 can comprise a number of electrons in a conduction that is equal to a number of holes in a valence band. Wherein the implanting at 904 forms a plurality of diode junctions 118, the one or more intrinsic regions 120 can be located between a first diode junction 118 from the plurality of diode junctions 118 and a second diode junction 118 from the plurality of diode junctions 118.

The method 900 can further comprise etching a first trench 114 into the first conductivity layer 113 and/or etching a second trench 116 into the second conductivity layer 115. For example, a third masking layer 702 can be patterned over a portion of the first conductivity layer 113, a central region 106 of the electro-optic modulator 100 (e.g., comprising the one or more diode junctions 118 and/or the one or more intrinsic regions 120), and/or a portion of the second conductivity layer 115; wherein exposed portions of the first conductivity layer 113 and the second conductivity layer 115 can be etched (e.g., as illustrated in FIGS. 7A-8B). The first trench 114 and/or the second trench 116 can be formed using shallow etching techniques; wherein the first trench 114 extends into the first conductivity layer 113 without reaching the semiconductor substrate 108 (e.g., the buried oxide layer 110), and the second trench 116 extends into the second conductivity layer 115 without reaching the semiconductor substrate 108 (e.g., the buried oxide layer 110). The central region 106 (e.g., comprising one or more diode junctions 118 and/or one or more intrinsic regions 120) can be located between the first trench 114 and the second trench 116 along the "X" axis.

Figure 10:
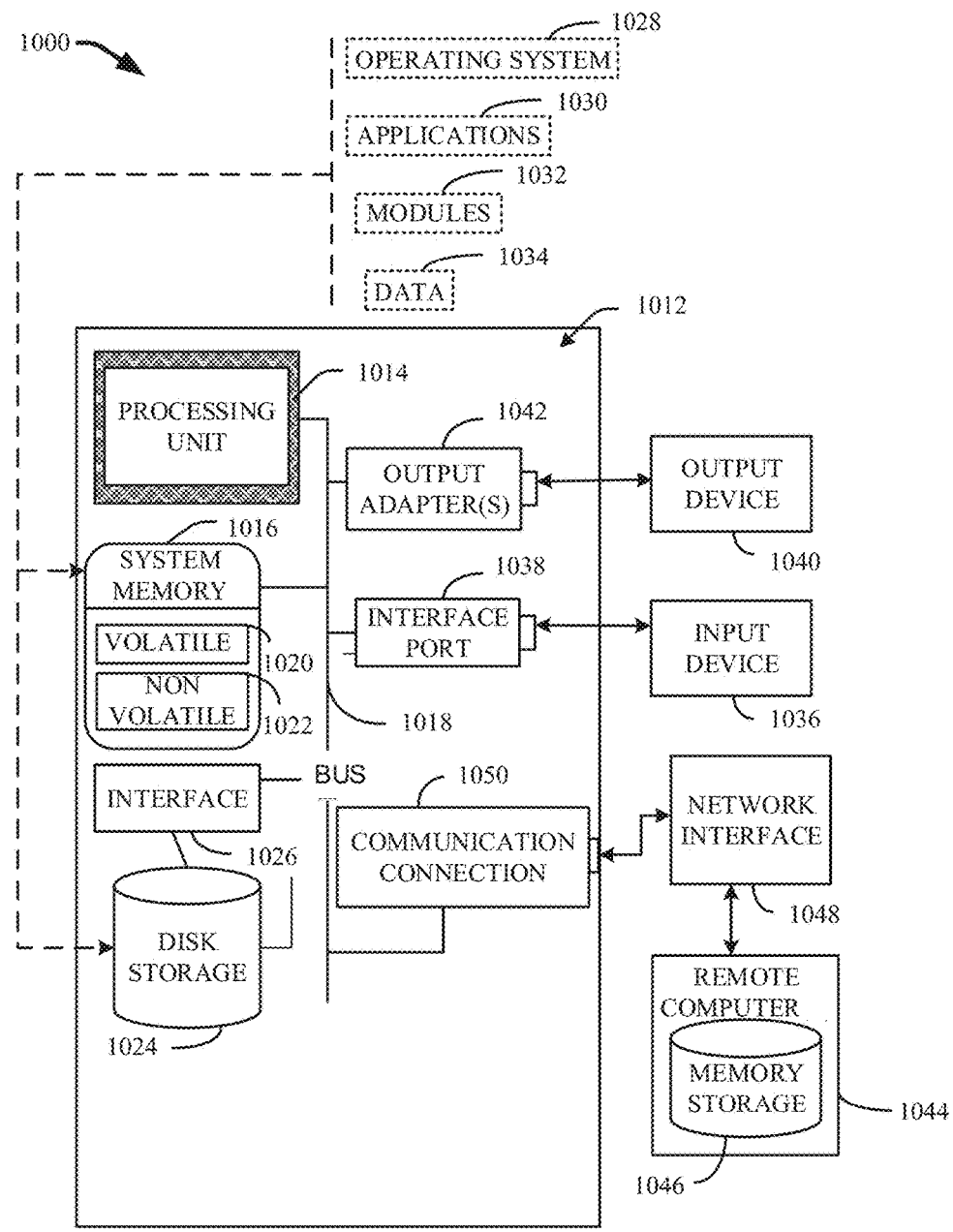
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity. With reference to FIG. 10, a suitable operating environment 1000 for implementing various aspects of this disclosure can include a computer 1012. The computer 1012 can also include a processing unit 1014, a system memory 1016, and a system bus 1018. The system bus 1018 can operably couple system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, can be stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface can be used, such as interface 1026. FIG. 10 also depicts software that can act as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 can take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through one or more input devices 1036. Input devices 1036 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1014 through the system bus 1018 via one or more interface ports 1038. The one or more Interface ports 1038 can include, for example, a serial port, a parallel port, a game port, and a universal serial bus (USB). One or more output devices 1040 can use some of the same type of ports as input device 1036. Thus, for example, a USB port can be used to provide input to computer 1012, and to output information from computer 1012 to an output device 1040. Output adapter 1042 can be provided to illustrate that there are some output devices 1040 like monitors, speakers, and printers, among other output devices 1040, which require special adapters. The output adapters 1042 can include, by way of illustration and not limitation, video and sound cards that provide a means of connection between the output device 1040 and the system bus 1018. It should be noted that other devices and/or systems of devices provide both input and output capabilities such as one or more remote computers 1044.

Computer 1012 can operate in a networked environment using logical connections to one or more remote computers, such as remote computer 1044. The remote computer 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer 1044. Remote computer 1044 can be logically connected to computer 1012 through a network interface 1048 and then physically connected via communication connection 1050. Further, operation can be distributed across multiple (local and remote) systems. Network interface 1048 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An electro-optic modulator apparatus comprising:
   an optical waveguide extending along a longitudinal direction; and
   a first lateral region, a second lateral region, and a central region located on a semiconductor substrate and extending along a first direction transverse to the longitudinal direction, the first lateral region being adjacent to a first side of the central region and having a first conductivity type, the second lateral region being adjacent to a second side of the central region and having a second conductivity type, the first side being opposite to the second side, and the central region comprising a first diode junction, a second diode junction, and an intrinsic region that separates the first diode junction and the second diode junction along the longitudinal direction.

2. The apparatus of claim 1, wherein the intrinsic region is an intrinsic silicon semiconductor region.

3. The apparatus of claim 1, wherein the first lateral region and the second lateral region flank the central region along the first axis, wherein the intrinsic region is located between the first diode junction and the second diode junction along a second axis and third axis, and wherein the second axis is parallel to the longitudinal direction, the first axis is perpendicular to the second axis and the third axis, and the second axis is perpendicular to the third axis.

4. The apparatus of claim 3, wherein the first lateral region comprises a first trench adjacent to the first side of the central region, and wherein the second lateral region comprises a second trench adjacent to the second side of the central region.

5. The apparatus of claim 1, wherein the intrinsic region is a portion of the semiconductor substrate.

6. The apparatus of claim 5, wherein the intrinsic region is formed by counter doping the portion of the semiconductor substrate with equal amounts of a first dopant having the first conductivity type and a second dopant having the second conductivity type.

7. The apparatus of claim 1, wherein the first lateral region comprises an N-doped implant, wherein the second lateral region comprises a P-doped implant.

8. The apparatus of claim 1, wherein the first lateral region comprises a P-doped implant, wherein the second lateral region comprises an N-doped implant.

9. A method comprising:
implanting a first dopant of a first conductivity type into a first portion of the semiconductor substrate to form a first conductivity layer;
implanting a second dopant of a second conductivity type into a second portion of the semiconductor substrate and at least a first portion of the first conductivity layer to form a second conductivity layer, wherein a portion of the second conductivity layer overlaps a second portion of the first conductivity layer to form at least two diode junctions; and
forming an intrinsic region of the semiconductor substrate separating respective junction diodes of the at least two diode junctions along a longitudinal direction of an optical waveguide.

10. The method of claim 9, further comprising:
etching a first trench into the first conductivity layer; and
etching a second trench into the second conductivity layer, wherein the at least two diode junctions and the intrinsic region are located between the first trench and the second trench.

11. The method of claim 10, wherein the first trench and the second trench are aligned along a first axis, and the intrinsic region is aligned along a second axis, and wherein the second axis is parallel to the longitudinal direction, and the first axis is perpendicular to the second axis.

12. The method of claim 9, wherein the intrinsic region is an intrinsic silicon semiconductor region.

13. The method of claim 9, wherein the first dopant comprises an N-doped implant, wherein the second dopant comprises a P-doped implant.

14. The method of claim 9, wherein the first dopant comprises a P-doped implant, wherein the second dopant comprises an N-doped implant.

15. An electro-optic modulator apparatus comprising:
an optical waveguide extending along a longitudinal direction;
a junction zone;
a first diode junction comprising a first layer having a first conductive type and a second layer having a second conductive type, wherein the first diode junction is located on a semiconductor substrate and within the junction zone;
a second diode junction comprising the first layer and the second layer, wherein the second diode junction is located on the semiconductor substrate and within the junction zone; and
an intrinsic region located on the semiconductor substrate and separating the first diode junction and the second diode junction along the longitudinal direction.

16. The apparatus of claim 15, wherein the intrinsic region is an intrinsic silicon semiconductor region.

17. The apparatus of claim 15, further comprising a first terminal zone and a second terminal zone flanking the junction zone, wherein the first terminal zone comprises the first layer, and wherein the second terminal zone comprises the second layer.

18. The apparatus of claim 17, further comprising a first trench extending into the first layer and a second trench extending into the second layer, wherein the first trench and the second trench flank opposite sides of the junction zone.

19. The apparatus of claim 18, wherein the first layer comprises an N-doped implant, wherein the second layer comprises a P-doped implant.

20. The apparatus of claim 18, wherein the first layer comprises a P-doped implant, wherein the second layer comprises an N-doped implant.

* * * * *